(12) United States Patent
Chang et al.

(10) Patent No.: US 12,522,724 B2
(45) Date of Patent: Jan. 13, 2026

(54) POLYMER, DISPERSION, AND PAINT

(71) Applicant: INDUSTRIAL TECHNOLOGY RESEARCH INSTITUTE, Hsinchu (TW)

(72) Inventors: Cha-Wen Chang, Hsinchu (TW); Jen-Yu Chen, New Taipei (TW); Wan-Jung Teng, Xinfeng Township (TW); Wen-Pin Chuang, Hsinchu (TW); Ruo-Han Yu, Yilan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 586 days.

(21) Appl. No.: 17/993,420

(22) Filed: Nov. 23, 2022

(65) Prior Publication Data
US 2024/0093024 A1    Mar. 21, 2024

(30) Foreign Application Priority Data
Sep. 5, 2022 (TW) .................................. 111133495

(51) Int. Cl.
*C08L 67/04* (2006.01)
*C09D 167/04* (2006.01)

(52) U.S. Cl.
CPC ............ *C08L 67/04* (2013.01); *C09D 167/04* (2013.01)

(58) Field of Classification Search
None
See application file for complete search history.

(56) References Cited

U.S. PATENT DOCUMENTS

| | | | |
|---|---|---|---|
| 7,500,743 B2 | 3/2009 | Takashima | |
| 7,574,166 B2 | 8/2009 | Murata et al. | |
| 8,129,476 B2 | 3/2012 | Göbelt et al. | |
| 2004/0229044 A1 | 11/2004 | Goto | |
| 2007/0281250 A1 | 12/2007 | Aono | |
| 2010/0022662 A1* | 1/2010 | Gobelt | C09C 1/24 525/327.4 |
| 2010/0099813 A1* | 4/2010 | Gobelt | C08F 291/00 525/379 |

FOREIGN PATENT DOCUMENTS

| | | |
|---|---|---|
| CN | 106750342 A | 11/2020 |
| TW | I376387 B | 11/2012 |
| TW | I734556 B | 7/2021 |

OTHER PUBLICATIONS

Qianping et al., "SMA-g-MPEG comb-like polymer as a dispersant for Al2O3 suspensions," Elsevier, Applied Surface Science, vol. 258, Nov. 9, 2011, pp. 2447-2453.
Taiwanese Office Action and Search Report for Taiwanese Application No. 111133495, dated Mar. 6, 2023.

* cited by examiner

*Primary Examiner* — Katarzyna I Kolb
(74) *Attorney, Agent, or Firm* — Birch, Stewart, Kolasch & Birch, LLP

(57) ABSTRACT

A polymer is formed by capping a copolymer-graft-polylactone with an alcohol, wherein the copolymer is copolymerized from an anhydride monomer with a double bond, a monomer with a double bond, and an initiator. The polymer can be mixed with an organic solvent and pigment powder to form a dispersion. The dispersion can be mixed with a binder to form a paint.

11 Claims, No Drawings

POLYMER, DISPERSION, AND PAINT

CROSS REFERENCE TO RELATED APPLICATIONS

The present application is based on, and claims priority from, Taiwan Application Serial Number 111133495, filed on Sep. 5, 2022, the disclosure of which is hereby incorporated by reference herein in its entirety.

TECHNICAL FIELD

The technical field relates to a paint, and in particular it relates to a dispersant for the paint.

BACKGROUND

White paint requires high tinting ability, high opacity, and the like. However, the critical problem with the white paint is $TiO_2$ being easily aggregated and precipitated; it cannot be stably dispersed and is not compatible with resin, thereby degrading the paint's properties. As such, a universal white paint and a dispersant are therefore called for.

SUMMARY

One embodiment of the disclosure provides a polymer formed by capping a copolymer-graft-polylactone with an alcohol, wherein the copolymer is copolymerized from an anhydride monomer with a double bond, a monomer with a double bond, and an initiator.

One embodiment of the disclosure provides a dispersion, including 100 parts by weight of an organic solvent; 0.5 to 15 parts by weight of a polymer; and 10 to 82 parts by weight of a pigment powder, wherein the polymer is formed by capping a copolymer-graft-polylactone with an alcohol, wherein the copolymer is copolymerized from an anhydride monomer with a double bond, a monomer with a double bond, and an initiator.

One embodiment of the disclosure provides a paint, including 100 parts by weight of an organic solvent; 0.1 to 10 parts by weight of a polymer; 10 to 60 parts by weight of a pigment powder; and 10 to 70 parts by weight of binder, wherein the polymer is formed by capping a copolymer-graft-polylactone with an alcohol, wherein the copolymer is copolymerized from an anhydride monomer with a double bond, a monomer with a double bond, and an initiator.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

Some embodiments of the disclosure provide a polymer to serve as a dispersant. The polymer can be mixed with an organic solvent and a pigment powder to form a dispersion. The dispersion can be mixed with a binder to form a paint.

One embodiment of the disclosure provides a polymer formed by capping a copolymer-graft-polylactone with an alcohol, wherein the copolymer is copolymerized from an anhydride monomer with a double bond, a monomer with a double bond, and an initiator. In one embodiment, the anhydride monomer with a double bond and the monomer with a double bond may have a molar ratio of 1:2.3 to 1:0.9. In one embodiment, the anhydride monomer with a double bond can be maleic anhydride, methyl maleic anhydride, dimethyl maleic anhydride, or another suitable monomer. In one embodiment, the monomer with a double bond can be ethylene, propylene, isobutylene, methacrylic acid, acrylic acid, styrene, methyl methacrylate, methyl acrylate, ethyl methacrylate, ethyl acrylate, another suitable monomer, or a combination thereof. In one embodiment, the polylactone can be polycaprolactone, polyvalerolactone, or polybutyrolactone terminated with monohydric alcohol. In some embodiments, the initiator can be dibenzamidine peroxide, 2,2'-azobisisobutyronitrile, di(t-butyl) peroxide, t-butylhydroperoxide, 1,1'-azo(cyanocyclohexane), 2,5-dimethyl-2,5-bis(t-butyl peroxide) hexane, t-butyl peroyxbenzoate, cumene hydroperoxide, dicumyl peroxide, lauryl peroxide, or t-butyl peroxyacetate.

In some embodiments, the polymer has a chemical structure of

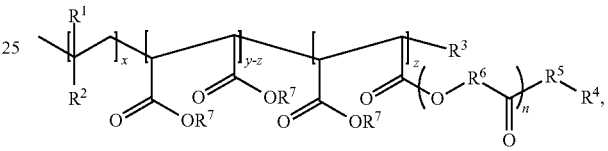

wherein $R^1$ is H or methyl group; $R^2$ is H, $C_{6-12}$ aryl group, $C_{3-12}$ heteroaryl group, or $C_{1-10}$ alkyl group; $R^3$ is H, methyl group, phenyl group, cumyl group, cumyl ester group, cumyl ether group, t-butyl ether group, benzoate group, cyanocyclohexane group, isobutyronitrile group, $C_{2-11}$ alkyl group, $C_{2-11}$ alkyl ester group, $C_{6-12}$ aryl group, $C_{3-12}$ heteroaryl group, or $C_{2-10}$ aliphatic group; $R^4$ is $C_{1-12}$ alkyl group; $R^5$ is O; $R^6$ is $C_{4-12}$ alkylene group; each of $R^7$ is H or $C_{1-12}$ alkyl group, and H and $C_{1-12}$ alkyl group have a ratio of 1:99 to 50:50. If H amount is too much, the capping ratio will be insufficient and the polymer cannot form a stable dispersion with the titanium dioxide. x is 8 to 21. If x is too small, the adsorption force of the dispersant to the powder will be lowered. If x is too large, the polarity of the dispersant will be lowered. y is 8 to 10. If y is too small, the grafted solvation segments of dispersant will be decreased. If y is too large, the polarity of the dispersant will be increased. z is 1 to 5. If z is too small, it cannot provide efficient steric effect. If z is too large, the requirement amount of the dispersant will be too much. n is 15 to 90. If n is too small, it cannot provide efficient steric effect. If n is too large, the amount of the pigment powder that can be dispersed is decreased.

In some embodiments, $0.1 \leq z/y \leq 0.5$. The value of z/y can be considered as the grafting ratio of the polylactone. If the value of z/y is too high, the required amount of the dispersant will be too much. If the value of z/y is too low, it cannot provide efficient steric effect. In some embodiments, the acid value of the polymer is 5 mg KOH/g to 50 mg KOH/g. The overly high acid value means that the ratio of H to $C_{1-12}$ alkyl group in $R^7$ is too high, and the capping ratio will be insufficient. As such, the stability of the titanium dioxide dispersed by the polymer is insufficient.

In some embodiments, the polymer has a number average molecular weight (Mn) of 3,000 g/mole to 20,000 g/mole. For example, the polymer may have Mn of 3,000 to 7,000, Mn of 7,000 to 10,000, Mn of 10,000 to 15,000, or Mn of 15,000 to 20,000. If Mn of the polymer is too low or too high, the pigment powder cannot be efficiently dispersed.

In one embodiment, the aforementioned polymer is a non-aqueous polymer. The polymer is synthesized as below. It should be noted that the following method is only for illustration rather than limiting the disclosure. One skilled in the art may adopt applicable apparatuses and chemicals to synthesize the polymer. First, an anhydride monomer with a double bond and a monomer with a double bond in the presence of dicumyl peroxide (serving as initiator) are copolymerized in cumene (serving as solvent) to form copolymer, as shown below:

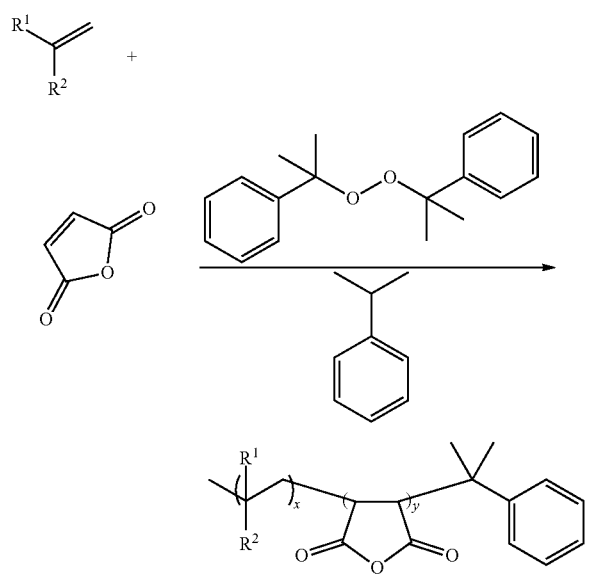

The above polymerization mechanism is radical polymerization, but the disclosure is not limited thereto. For example, one skilled in the art may adopt another initiator to perform the radical polymerization, or another polymerization mechanism such as reversible addition-fragmentation chain transfer (RAFT) polymerization or another applicable polymerization mechanism. The copolymer can be block copolymer, alternating copolymer, or random copolymer. In some embodiments, the copolymer can be directly commercially available rather than self-synthesized.

Subsequently, alcohol can be used to react with the lactone to perform the polymerization and terminating one end of the polylactone, thereby forming a polylactone with a terminated group. The reaction is shown below. It should be understood that the $R^4$-$R^5$—H is alcohol, and $R^5$ is O. $R^6$ is determined by the lactone type. For example, if lactone is caprolactone, $R^6$ is $C_5$ alkylene group.

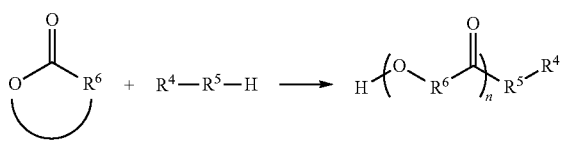

Subsequently, the polylactone can be used to graft onto the polymer, as shown below:

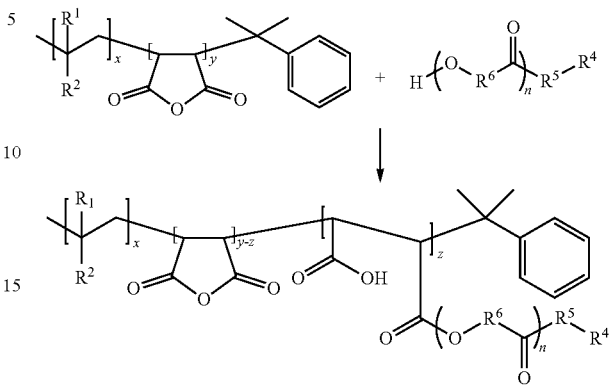

Subsequently, the alcohol can be used to esterify the anhydride and the carboxylic acid (e.g. capping). The reaction is shown below:

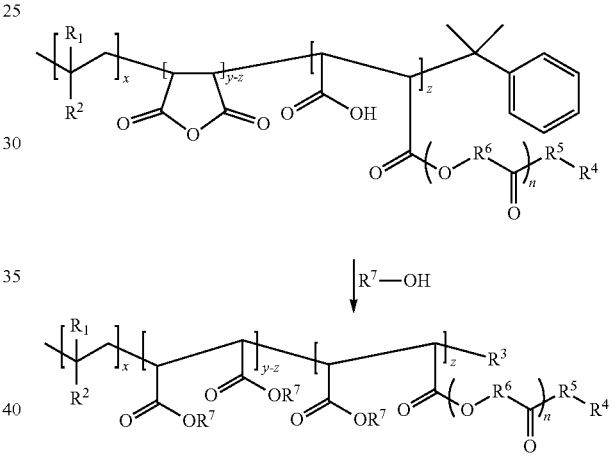

In the above formula, the repeating units corresponding to x, y-z, and z are arranged in a random manner rather than in a block manner. In general, the grafting distribution of the polylactone is uniform, which is beneficial to uniformly disperse the pigment powder. For example, the polymer may have a polydispersity index (PDI, Mw/Mn) of 1.0 to 2.0. When the PDI of the polymer is too large, it exhibits that the grafting positions of the polylactone is overly non-uniform, which is unfavorable in the dispersing application.

The polymer can be used to disperse a pigment powder. A dispersion in one embodiment of the disclosure may include 100 parts by weight of an organic solvent, 0.5 to 15 parts by weight of the polymer, and 10 to 82 parts by weight of a pigment powder. For example, the organic solvent includes acetone, methyl ethyl ketone, ethyl acetate, n-butyl acetate, acrylate, methacrylate, a derivative thereof, or a combination thereof. If the polymer amount is too low, the pigment powder cannot be efficiently dispersed. If the polymer amount is too high, the cost will be increased without any obvious advantage. If the pigment powder amount is too low, the actual efficiency of the product will be lowered. If the pigment powder amount is too high, the viscosity of the dispersion will be overly high and the organic solvent will be easily evaporated to precipitate the pigment powder. In the dispersion, the average diameter of the pigment powder can be 200 nm to 360 nm. In general, the smaller average diameter of the pigment powder is better. In addition, the dispersion at 1000 rpm may have a viscosity of 15 cps to 130 cps. Moreover, the dispersion can be stored at room temperature over half year without dramatically change of its viscosity and pigment powder diameter (e.g. the dispersion has an excellent stability).

In addition, the dispersion can be mixed with a binder to form a paint. For example, the paint may include 100 parts by weight of the organic solvent, 0.1 to 10 parts by weight of the polymer; 10 to 60 parts by weight of the pigment powder, and 10 to 70 parts by weight of binder. If the binder amount is too low, the adhesion of the pigment powder will be lowered. If the binder amount is too high, the pigment powder property is difficult to exhibit. In some embodiments, the binder can be polyester, polyacrylate polyol, polyurethane, polyacrylate, or a combination thereof. For example, the commercially available binder such as high molecular weight polyester HE558 (commercially available from AN FONG DEVELOPMENT CO., LTD.), polyacrylate AC-1080 (commercially available from AN FONG DEVELOPMENT CO., LTD.), polyacrylate polyol AC-1102 (commercially available from AN FONG DEVELOPMENT CO., LTD.), or polyurethane 5719 (commercially available from Lubrizol Corporation) can be mixed with the dispersion to form the paint. In the paint, the pigment volume concentration (PVC) can be 15% to 30%. If the pigment powder amount is too low, the opacity of the paint will be lowered. If the pigment powder amount is too high, the gloss of the paint will be degraded. In the paint, the average diameter of the pigment powder can be 200 nm to 420 nm. In general, if the average diameter of the pigment powder in the paint is dramatically larger than the average diameter of the pigment powder in the dispersion, it means that the dispersant (e.g. polymer) and the binder have a poor compatibility. In some embodiments, the average diameter difference between the pigment powder in the solvent-based paint and in the dispersion can be less than 5%.

The solvent-based paint is coated on a substrate and then baking dried to form a film having excellent gloss and opacity. In short, the polymer of the disclosure is an appropriate dispersant for the pigment powder, and the dispersion containing the polymer is proper to prepare the paint.

In the described embodiments, the major pigment powder can be $TiO_2$ powder serving as white pigment. However, the polymer is not limited to disperse the $TiO_2$ powder. For example, the pigment powder can be yellow inorganic pigment such as cadmium yellow (PY35, C.I.77205, CAS No.: 12237-67-1), titanium nickel yellow (PY53, C.I.77788, CAS No.: 8007-18-9), praseodymium zirconium yellow (PY159, C.I.77997, CAS No.: 68187-15-5), chromium titanium yellow (PY162, C.I.77896, CAS No.: 68611-42-7; PY163, C.I.77897, CAS No.: 68186-92-5), or bismuth yellow (PY184, C.I.771740, CAS No.: 14059-33-7); magenta inorganic pigment such as iron red (PR101, C.I.77491, CAS No.: 1317-60-8), cadmium red (PR108, C.I.77202, CAS No.: 58339-34-7), lead chromium red (PR104, C.I.77605, CAS No.: 12656-85-8; PR105, C.I.77578, CAS No.: 1314-41-6), or iron zirconium red (PR232, C.I.77996, CAS No.: 68412-79-3); cyan inorganic pigment such as cobalt blue (PB28, C.I.77364, CAS No.:68187-40-6) or cobalt chromium blue (PB36, C.I.77343, CAS No.:68187-11-1); black inorganic pigment such as manganese iron black (PBK26, C.I.77494, CAS No.:68186-94-7; PBK33, C.I.77537, CAS No.: 75864-23-2), cobalt iron chromium black (PBK27, C.I.77502, CAS No.:68186-97-0), copper chromium black (PBK28, C.I.77428, CAS No.:68186-91-4), chromium iron black (PBK30, C.I.77504, CAS No.: 71631-15-7), or titanium black (PBK35, C.I.77890, CAS No.: 70248-09-8); white inorganic pigment such as titanium white (PW6, C.I.77891, CAS No.: 13463-67-7), zirconium white (PW12, C.I.77990, CAS No.: 1314-23-4), or zinc white (PW4, C.I.77947, CAS No.: 1314-13-2); orange inorganic powder such as cadmium orange (PO20, C.I.77199, CAS No.: 12656-57-4) or orange chromium yellow (PO21, C.I.77601, CAS No.: 1344-38-3); or green inorganic pigment such as chromium green (PG17, C.I.77288, CAS No.: 1308-38-9), cobalt green (PG19, C.I.77335, CAS No.: 8011-87-8), cobalt chromium green (PG26, C.I.77344, CAS No.: 68187-49-5), or cobalt titanium green (PG50, C.I.77377, CAS No.: 68186-85-6). The pigment powder can be another suitable pigment, and not limited to the described pigments.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity.

EXAMPLES

In following Examples, the number average molecular weights of the polymers were measured by GPC, in which the standard was polystyrene, the columns were Shodex KF-802.5, KF-803, KF-804, and KF-805, the sample concentration was 0.3%, and the eluent was tetrahydrofuran.

In following Examples, the diameters of titanium dioxide particles were measured by a laser dynamic scattering spectrometer (Malvern Nano-S), in which the samples were diluted by n-butyl acetate solvent at 25° C. The viscosities of the paints or dispersions were measured by a shear rate rheometer (BROOKFIELD) at 1000 rpm and 25° C.

In following Examples, the dispersing effect of the dispersion was defined as excellent (average diameter≤360 nm), fair (average diameter was 361 nm to 400 nm), and poor (average diameter≥401 nm). The dispersing effect of the paint was defined as excellent (average diameter≤420 nm), fair (average diameter was 421 nm to 460 nm), and poor (average diameter≥461 nm).

Synthesis Example 1-1

61.60 g of caprolactone was added into a reaction bottle. 0.05 g of stannous 2-ethylhexanoate and 5.00 g of butanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as butoxy group terminated polycaprolactone. The chemical structure of the product was

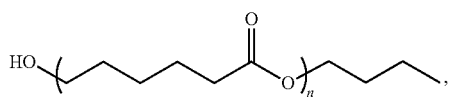

and n was 7 to 10.

Synthesis Example 1-2

183.25 g of caprolactone was added into a reaction bottle. 0.14 g of stannous 2-ethylhexanoate and 7.00 g of butanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as butoxy group terminated polycaprolactone. The chemical structure of the product was

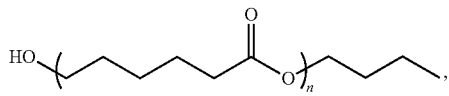

and n was 16 to 19.

Synthesis Example 1-3

554.38 g of caprolactone was added into a reaction bottle. 0.42 g of stannous 2-ethylhexanoate and 8.00 g of butanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as butoxy group terminated polycaprolactone. The chemical structure of the product was

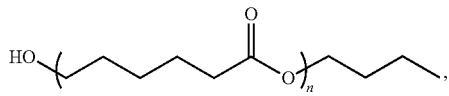

and n was 44 to 47.

Synthesis Example 1-4

803.85 g of caprolactone was added into a reaction bottle. 0.60 g of stannous 2-ethylhexanoate and 6.00 g of butanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as butoxy group terminated polycaprolactone. The chemical structure of the product was

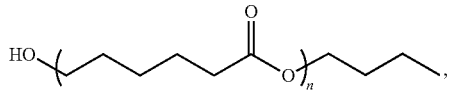

and n was 86 to 89.

Synthesis Example 1-5

485.08 g of caprolactone was added into a reaction bottle. 0.36 g of stannous 2-ethylhexanoate and 3.00 g of butanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as butoxy group terminated polycaprolactone. The chemical structure of the product was

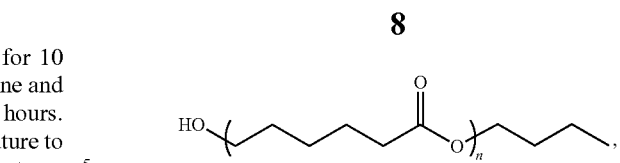

and n was 104 to 107.

Synthesis Example 1-6

513.96 g of caprolactone was added into a reaction bottle. 0.39 g of stannous 2-ethylhexanoate and 4.61 g of ethanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as ethoxy group terminated polycaprolactone. The chemical structure of the product was

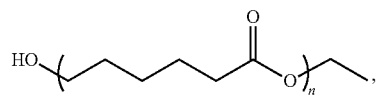

and n was 44 to 47.

Synthesis Example 1-7

410.98 g of caprolactone was added into a reaction bottle. 0.31 g of stannous 2-ethylhexanoate and 14.91 g of dodecanol were added into a 20 mL sample bottle and stirred for 10 minutes, and the solution was added to the caprolactone and heated to 110° C. to 130° C. to react for 24 hours to 36 hours. The reaction result was cooled down to room temperature to obtain a solid as dodecanoxy group terminated polycaprolactone. The chemical structure of the product was

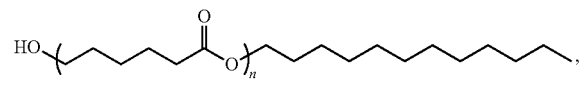

and n was 44 to 47.

Comparative Example 1 (Polymer d, Dispersion LW36)

50.00 g of SMA®1000 (commercially available from Cray Valley) was added to 90 mL of methyl ethyl ketone (MEK) under nitrogen, and heated and stirred to be completely dissolved. In addition, 136.96 g of the product in Synthesis Example 1-2 and 0.94 g of p-toluenesulfonic acid were added to 130 mL of MEK, heated to be completely dissolved, and then added to the SMA®1000 solution to react at 70° C. to 85° C. for 6 hours. Few water was then added to the reaction to react for additional 1 hour, and the solvent was removed under vacuum to obtain polymer d. The graft ratio of the polycaprolactone was about 32%, and the acid value was about 100 mg KOH/g to 120 mg KOH/g. The reaction was shown below, in which x, y, z, and n correspond to the compositions and amounts of the reactants, such as x was about 10 to 12, y was about 8 to 10, z was about 2 to 3, and n was about 16 to 19. The IR spectrum of SMA®1000 had C=O signal (1778 cm$^{-1}$) of maleic anhydride. The IR spectrum of the product (polymer d) had COOH signal (3505 cm$^{-1}$), CH$_2$ signal (2866 cm$^{-1}$), C=O signal (1731 cm$^{-1}$) of the ester group, and C—O—C signal (1166 cm$^{-1}$). As known from the IR spectra, the product in Synthesis Example 1-2 and the maleic anhydride of SMA®1000 were reacted to perform ring-opening addition.

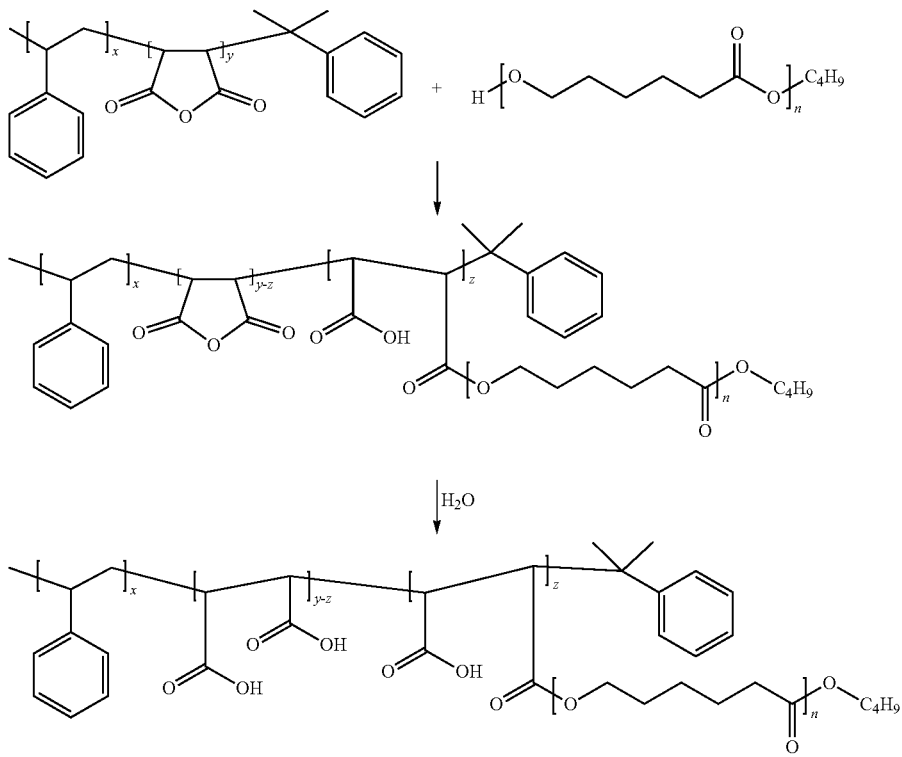

The polymer d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 µm to obtain white slurry (dispersion LW36). In the white slurry, TiO$_2$ occupied 75 wt %, the polymer d occupied 1.69 wt %, and n-butyl acetate occupied the remaining part. When the dispersion was left to stand for a while particles start to aggregate, it means that the dispersing effect was poor.

Example 1 (Polymer 1d, Dispersion LW98)

20.00 g of SMA®1000 (commercially available from Cray Valley) was added to 50 mL of MEK under nitrogen, and heated and stirred to be completely dissolved. In addition, 80.00 g of the product in Synthesis Example 1-2 and 0.50 g of p-toluenesulfonic acid were added to 120 mL of MEK, heated to be completely dissolved, and then added to the SMA®1000 solution to react at 85° C. for 6 hours. 7.22 g of butanol serving as a capping agent was then added to the reaction to react at 85° C. for 3 hours, and the solvent was removed under vacuum to obtain polymer 1d. The graft ratio of the polycaprolactone was about 47%, and the acid value was about 15 mg KOH/g to 25 mg KOH/g. The reaction was shown below, in which x, y, z, and n correspond to the compositions and amounts of the reactants, such as x was about 10 to 12, y was about 8 to 10, z was about 3 to 4, and n was about 16 to 19. R$^7$ was H or butyl group, and H and butyl group had a ratio of about 20/80 (e.g. capping ratio is about 80%). The IR spectrum of the product (polymer 1d) had COOH signal (3505 cm$^{-1}$), CH$_2$ signal (2869 cm$^{-1}$), C=O signal (1735 cm$^{-1}$) of the ester group, and C—O—C signal (1165 cm$^{-1}$). As known from the IR spectrum, the product in Synthesis Example 1-2 and the maleic anhydride of SMA®1000 were reacted to perform ring-opening addition, and butanol could greatly esterify anhydrides or carboxylic acids to achieve the capping effect.

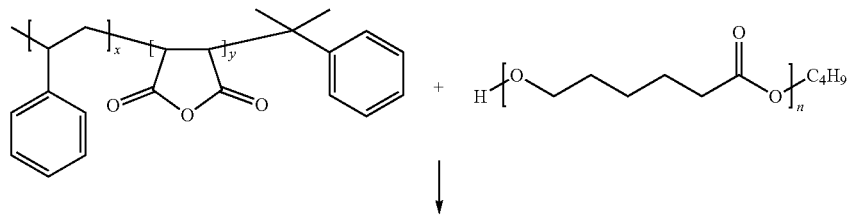

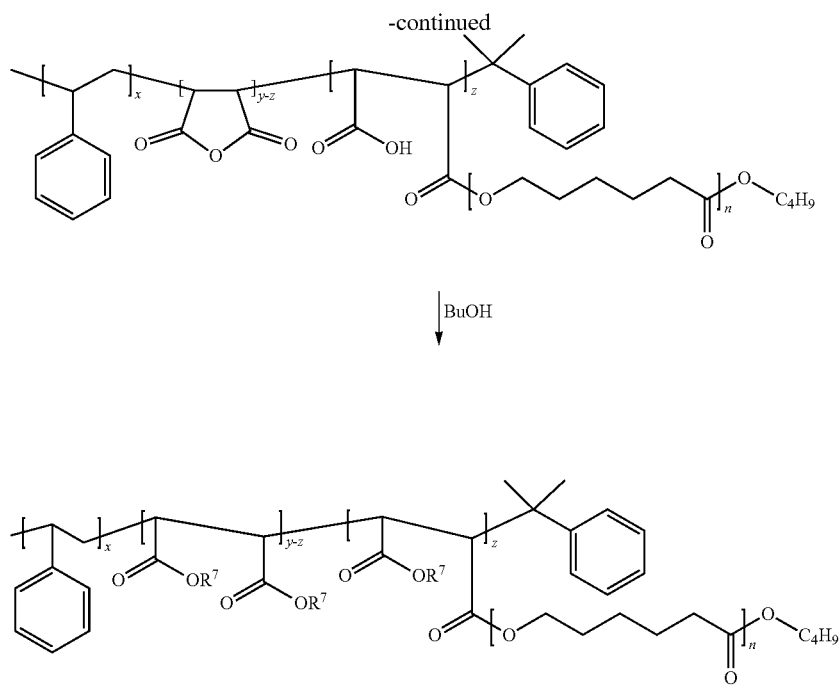

The polymer 1d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW98). In the white slurry, $TiO_2$ occupied 75 wt %, the polymer 1d occupied 1.69 wt %, and n-butyl acetate occupied the remaining part. The average diameter of the titanium dioxide in the dispersion was 299 nm, it means that the dispersing effect was excellent (average diameter≤360 nm). The viscosity of the dispersion at 1000 rpm and 25° C. was 22 cps.

Example 2 (Polymer 2d, Dispersion LW106)

10.00 g of SMA®1000 (commercially available from Cray Valley) was added to 35 mL of MEK under nitrogen, and heated and stirred to be completely dissolved. In addition, 71.38 g of the product in Synthesis Example 1-3 and 0.36 g of p-toluenesulfonic acid were added to 100 mL of MEK, heated to be completely dissolved, and then added to the SMA®1000 solution to react at 70° C. to 85° C. for 3 hours. 4.08 g of butanol serving as a capping agent was then added to the reaction to react at 70° C. to 85° C. for 3 hours, and the solvent was removed under vacuum to obtain polymer 2d. The graft ratio of the polycaprolactone was about 32%, and the acid value was about 10 mg KOH/g to 20 mg KOH/g. The reaction may refer to the reaction formulae in Example 1, in which x, y, z, and n correspond to the compositions and amounts of the reactants, such as x was about 10 to 12, y was about 8 to 10, z was about 2 to 3, and n was about 44 to 47. $R^7$ was H or butyl group, and H and butyl group had a ratio of about 20/80 (e.g. capping ratio is about 80%). The IR spectrum of the product (polymer 2d) had COOH signal (3505 $cm^{-1}$), $CH_2$ signal (2869 $cm^{-1}$), C=O signal (1733 $cm^{-1}$) of the ester group, and C—O—C signal (1167 $cm^{-1}$). As known from the IR spectrum, the product in Synthesis Example 1-3 and the maleic anhydride of SMA®1000 were reacted to perform ring-opening addition, and butanol could greatly esterify anhydrides or carboxylic acids to achieve the capping effect.

The polymer 2d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW106). In the white slurry, $TiO_2$ occupied 75 wt %, the polymer 2d occupied 1.69 wt %, and n-butyl acetate occupied the remaining part. The average diameter of the titanium dioxide in the dispersion was 317 nm, it means that the dispersing effect was excellent (average diameter≤360 nm). The viscosity of the dispersion at 1000 rpm and 25° C. was 34 cps.

Comparative Example 2 (Polymer 3d, Dispersion LW97)

20.00 g of SMA®1000 (commercially available from Cray Valley) was added to 50 mL of MEK under nitrogen, and heated and stirred to be completely dissolved. In addition, 140.00 g of the product in Synthesis Example 1-2 and 0.80 g of p-toluenesulfonic acid were added to 180 mL of MEK, heated to be completely dissolved, and then added to the SMA®1000 solution to react at 70° C. to 85° C. for 3 hours. 5.00 g of butanol serving as a capping agent was then added to the reaction to react at 70° C. to 85° C. for 3 hours, and the solvent was removed under vacuum to obtain polymer 3d. The graft ratio of the polycaprolactone was about 80%, and the acid value was about 7 mg KOH/g to 17 mg KOH/g. The reaction may refer to the reaction formulae in Example 1, in which x, y, z, and n correspond to the compositions and amounts of the reactants, such as x was about 10 to 12, y was about 8 to 10, z was about 6 to 7, and n was about 16 to 19. $R^7$ was H or butyl group, and H and butyl group had a ratio of about 20/80 (e.g. capping ratio is about 80%). The IR spectrum of SMA®1000 had C=O signal (1778 $cm^{-1}$) of maleic anhydride. The IR spectrum of the product (polymer 3d) had COOH signal (3505 $cm^{-1}$), $CH_2$ signal (2866 $cm^{-1}$), C=O signal (1731 $cm^{-1}$) of the ester group, and C—O—C signal (1168 $cm^{-1}$). As known from the IR spectrum, the product in Synthesis Example 1-2 and the maleic anhydride of SMA®1000 were reacted to perform ring-opening addition, and butanol could greatly esterify anhydrides or carboxylic acids to achieve the capping effect.

The polymer 3d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW97). In the white slurry, $TiO_2$ occupied 75 wt %, the polymer 3d occupied 1.69 wt %, and n-butyl acetate occupied the remaining part. The average diameter of the titanium dioxide in the dispersion was 365 nm, it means that the dispersing effect was fair (average diameter was 361 nm to 400 nm). The viscosity of the dispersion at 1000 rpm and 25° C. was 94 cps.

Comparative Example 3 (Blend 4d, Dispersion LW134)

10.00 g of SMA®1000 (commercially available from Cray Valley) was added to 50 mL of MEK under nitrogen, and heated and stirred to be completely dissolved. In addition, 71.38 g of the product in Synthesis Example 1-3 was added to 120 mL of MEK, heated to be completely dissolved, and then added to and mixed with the SMA®1000 solution, and the solvent was removed under vacuum to obtain blend 4d. The blend 4d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 m to obtain white slurry (dispersion LW134). In the white slurry, $TiO_2$ occupied 75 wt %, the blend 4d occupied 1.69 wt %, and n-butyl acetate occupied the remaining part. The titanium dioxide could not be dispersed in the blend 4d/n-butyl acetate solution.

Comparative Example 4 (BYK111, Dispersion LW61)

The dispersant BYK111 (commercially available from BYK), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW61). In the white slurry, $TiO_2$ occupied 75 wt %, BYK111 occupied 1.69 wt %, and n-butyl acetate occupied the remaining part. The average diameter of the titanium dioxide in the dispersion was 402 nm, it means that the dispersing effect was poor (average diameter≥401 nm). The viscosity of the dispersion at 1000 rpm and 25° C. was 71 cps.

Comparative Example 5 (EFKA4610, Dispersion LW65)

The dispersant EFKA4610 (commercially available from BASF), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW65). In the white slurry, $TiO_2$ occupied 75 wt %, EFKA4610 occupied 1.69 wt %, and n-butyl acetate occupied the remaining part. The average diameter of the titanium dioxide in the dispersion was 510 nm, it means that the dispersing effect was poor (average diameter≥401 nm). The viscosity of the dispersion at 1000 rpm and 25° C. was 124 cps.

Comparative Example 6 (D140G, Dispersion LW73)

The dispersant D140G (commercially available from HOU CHI CHEMICAL CO., LTD.), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW73). In the white slurry, $TiO_2$ occupied 75 wt %, D140G occupied 1.69 wt %, and n-butyl acetate occupied the remaining part. The average diameter of the titanium dioxide in the dispersion was 310 nm, it means that the dispersing effect was excellent (average diameter≥360 nm). The viscosity of the dispersion at 1000 rpm and 25° C. was 20 cps.

Comparative Example 7 (D147, Dispersion LW74)

The dispersant D147 (commercially available from HOU CHI CHEMICAL CO., LTD.), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 m to obtain white slurry (dispersion LW74). In the white slurry, $TiO_2$ occupied 75 wt %, D147 occupied 1.69 wt %, and n-butyl acetate occupied the remaining part. The average diameter of the titanium dioxide in the dispersion was 524 nm, it means that the dispersing effect was poor (average diameter≥401 nm). The viscosity of the dispersion at 1000 rpm and 25° C. was 73 cps.

Example 3 (LW98, Y08)

4.92 g of the dispersion LW98 in Example 1 and 5.08 g of high molecular weight polyester binder solution HE558 (commercially available from AN FONG DEVELOPMENT CO., LTD., in which the high molecular weight polyester occupied 52 wt %) were mixed, and the volume concentration of the pigment was 28%. The mixture was stirred at 800 rpm to 1000 rpm for 0.5 hours to obtain a white paint Y08. The average diameter of the titanium dioxide in the paint was 396 nm, it means that the dispersing effect was excellent (average diameter≤420 nm). The viscosity of the paint at 1000 rpm and 25° C. was 632 cps.

Example 4 (LW98, Y09)

5.39 g of the dispersion LW98 in Example 1 and 4.61 g of polyacrylate binder solution AC-1080 (commercially available from AN FONG DEVELOPMENT CO., LTD., in which polyacrylate occupied 63 wt %) were mixed, and the volume concentration of the pigment was 28%. The mixture was stirred at 800 rpm to 1000 rpm for 0.5 hours to obtain a white paint Y09. The average diameter of the titanium dioxide in the paint was 334 nm, it means that the dispersing effect was excellent (average diameter≤420 nm). The viscosity of the paint at 1000 rpm and 25° C. was 99 cps.

Example 5 (LW98, Y10)

11.31 g of the dispersion LW98 in Example 1 and 8.69 g of polyacrylate polyol binder solution AC-1102 (commercially available from AN FONG DEVELOPMENT CO., LTD., in which polyacrylate polyol occupied 70 wt %) were mixed, and the volume concentration of the pigment was 28%. The mixture was stirred at 800 rpm to 1000 rpm for 0.5 hours to obtain a white paint Y10. The average diameter of the titanium dioxide in the paint was 300 nm, it means that the dispersing effect was excellent (average diameter 420 nm). The viscosity of the paint at 1000 rpm and 25° C. was 41 cps.

Example 6 (LW98, Y14)

3.58 g of the dispersion LW98 in Example 1 and 6.42 g of thermoplastic polyurethane binder solution 5719 (commercially available from Lubrizol Corporation, in which thermoplastic polyurethane occupied 30 wt %) were mixed, and the volume concentration of the pigment was 28%. The mixture was stirred at 800 rpm to 1000 rpm for 0.5 hours to obtain a white paint Y14. The average diameter of the titanium dioxide in the paint was 363 nm, it means that the dispersing effect was excellent (average diameter 420 nm). The viscosity of the paint at 1000 rpm and 25° C. was 325 cps.

Example 7 (LW98, Y15)

3.80 g of the dispersion LW98 in Example 1 and 6.20 g of polyester binder solution HE-561/33 (commercially available from AN FONG DEVELOPMENT CO., LTD., in which polyester occupied 33 wt %) were mixed, and the volume concentration of the pigment was 28%. The mixture was stirred at 800 rpm to 1000 rpm for 0.5 hours to obtain a white paint Y15. The average diameter of the titanium dioxide in the paint was 418 nm, it means that the dispersing effect was excellent (average diameter≤420 nm). The viscosity of the paint at 1000 rpm and 25° C. was 241 cps.

Comparative Example 8 (LW73, Y19)

3.80 g of the dispersion LW73 in Comparative Example 6 and 6.20 g of polyester binder solution HE-561/33 (commercially available from AN FONG DEVELOPMENT CO., LTD., in which polyester occupied 33 wt %) were mixed, and the volume concentration of the pigment was 28%. The mixture was stirred at 800 rpm to 1000 rpm for 0.5 hours to obtain a white paint Y19. The average diameter of the titanium dioxide in the paint was 543 nm, it means that the dispersing effect was poor (average diameter≥461 nm). The viscosity of the paint at 1000 rpm and 25° C. was 215 cps.

Comparative Example 9 (yb Paint, Y20/Y23)

Commercially available dispersant YB (provided by YB paint), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW75). In the white slurry, $TiO_2$ occupied 75 wt %, the dispersant YB occupied 1.69 wt %, and n-butyl acetate occupied the remaining part. The average diameter of the titanium dioxide in the dispersion was 294 nm, it means that the dispersing effect was excellent (average diameter≤360 nm). The viscosity of the dispersion at 1000 rpm and 25° C. was 25 cps.

4.89 g of the dispersion LW75 and 5.11 g of high molecular weight polyester binder solution HE558 (commercially available from AN FONG DEVELOPMENT CO., LTD., in which the high molecular weight polyester occupied 52 wt %) were mixed, and the volume concentration of the pigment was 28%. The mixture was stirred at 800 rpm to 1000 rpm for 0.5 hours to obtain a white paint Y20. The titanium dioxide in the paint was agglomerated.

3.56 g of the dispersion LW75 and 6.44 g of thermoplastic polyurethane binder solution 5719 (commercially available from Lubrizol Corporation, in which thermoplastic polyurethane occupied 30 wt %) were mixed, and the volume concentration of the pigment was 28%. The mixture was stirred at 800 rpm to 1000 rpm for 0.5 hours to obtain a white paint Y23. The titanium dioxide in the paint was agglomerated.

Example 8 (Gloss and Opacity Comparison)

The white paint Y09 of Example 4, the white paint Y10 of Example 5, the white paint Y15 of Example 7, and the white paints Y19 of Comparative Example 8 were respectively coated onto glass substrates by No. 22 wire rod to form wet films having a thickness of about 27.43 μm. The wet films were heated and dried for 1 hour to obtain white films. In a gloss meter ZEHNTNER ZGM 1120, the white films were respectively irradiated by an incident light of 600 to measure their gloss. In addition, the opacities of the white films were measured according to the standard ASTM D2805. The white film formed from the white paint Y09 had a gloss of 99 (GU) and an opacity of 90.0%. The white film formed from the white paint Y10 had a gloss of 98 (GU) and an opacity of 90.8%. The white film formed from the white paint Y15 had a gloss of 96 (GU) and an opacity of 85.5%. The white film formed from the white paint Y19 had a gloss of 93 (GU) and an opacity of 82.8%. Accordingly, the gloss and the opacity of the white films formed from the paint containing the dispersants of Examples could be further improved, compared to the white film formed form the paint containing the commercially available dispersant.

Comparative Example 10

20.00 g of SMA®1000 (commercially available from Cray Valley) was added to 50 mL of MEK under nitrogen, and heated and stirred to be completely dissolved. In addition, 27.40 g of the product in Synthesis Example 1-1 and 0.24 g of p-toluenesulfonic acid were added to 50 mL of MEK, heated to be completely dissolved, and then added to the SMA®1000 solution to react at 70° C. to 85° C. for 4 hours. 8.15 g of butanol serving as a capping agent was then added to the reaction to react at 70° C. to 85° C. for 4 hours to obtain polymer 5d. The graft ratio of the polycaprolactone was about 32%, and the acid value was about 35 mg KOH/g to 45 mg KOH/g. The reaction may refer to the reaction formulae in Example 1, in which x, y, z, and n correspond to the compositions and amounts of the reactants, such as x was about 10 to 12, y was about 8 to 10, z was about 2 to 3, and n was about 7 to 10. $R^7$ was H or butyl group, and H and butyl group had a ratio of about 20/80 (e.g. capping ratio is about 80%).

The polymer 5d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW76). In the white slurry, $TiO_2$ occupied 75 wt %, the polymer 5d occupied 1.69 wt %, and n-butyl acetate occupied the remaining part. The average diameter of the titanium dioxide in the dispersion was 366 nm, it means that the dispersing effect was fair (average diameter was 361 nm to 400 nm). Moreover, the titanium dioxide was easily agglomerated. The viscosity of the dispersion at 1000 rpm and 25° C. was 52 cps.

Example 9

30.00 g of SMA®1000 (commercially available from Cray Valley) was added to 60 mL of MEK under nitrogen, and heated and stirred to be completely dissolved. In addition, 151.25 g of the product in Synthesis Example 1-4 and 0.91 g of p-toluenesulfonic acid were added to 200 mL of MEK, heated to be completely dissolved, and then added to the SMA®1000 solution to react at 85° C. for 6 hours. 9.14 g of butanol serving as a capping agent was then added to the reaction to react at 85° C. for 2 hours to obtain polymer 6d. The graft ratio of the polycaprolactone was about 12%, and the acid value was about 35 mg KOH/g to 45 mg KOH/g. The reaction may refer to the reaction formulae in Example 1, in which x, y, z, and n correspond to the compositions and amounts of the reactants, such as x was about 10 to 12, y was about 8 to 10, z was about 1 to 2, and n was about 86 to 89. $R^7$ was H or butyl group, and H and butyl group had a ratio of about 46/54 (e.g. capping ratio is about 54%).

The polymer 6d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW77). In the white slurry, $TiO_2$ occupied 75 wt %, the polymer 6d occupied 1.69 wt %, and n-butyl acetate occupied the remaining part. The average diameter of the titanium dioxide in the dispersion was 348 nm, it means that the dispersing effect was excellent (average diameter≤360 nm). The viscosity of the dispersion at 1000 rpm and 25° C. was 62 cps.

Comparative Example 11

30.00 g of SMA®1000 (commercially available from Cray Valley) was added to 60 mL of MEK under nitrogen, and heated and stirred to be completely dissolved. In addition, 180.00 g of the product in Synthesis Example 1-5 and 1.05 g of p-toluenesulfonic acid were added to 200 mL of MEK, heated to be completely dissolved, and then added to the SMA®1000 solution to react at 70° C. to 85° C. for 5 hours. 9.14 g of butanol serving as a capping agent was then added to the reaction to react at 70° C. to 85° C. for 3 hours to obtain polymer 7d. The graft ratio of the polycaprolactone was about 12%, and the acid value was about 30 mg KOH/g to 35 mg KOH/g. The reaction may refer to the reaction formulae in Example 1, in which x, y, z, and n correspond to the compositions and amounts of the reactants, such as x was about 10 to 12, y was about 8 to 10, z was about 1 to 2, and n was about 104 to 107. $R^7$ was H or butyl group, and H and butyl group have a ratio of about 46/54 (e.g. capping ratio is about 54%).

The polymer 7d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW78). In the white slurry, $TiO_2$ occupied 75 wt %, the polymer 7d occupied 1.69 wt %, and n-butyl acetate occupied the remaining part. The average diameter of the titanium dioxide in the dispersion was 369 nm, it means that the dispersing effect was fair (average diameter was 361 nm to 400 nm). The viscosity of the dispersion at 1000 rpm and 25° C. was 90 cps.

Comparative Example 12

40.00 g of SMA®1000 (commercially available from Cray Valley) was added to 70 mL of MEK under nitrogen, and heated and stirred to be completely dissolved. In addition, 38.52 g of the product in Synthesis Example 1-3 and 0.42 g of p-toluenesulfonic acid were added to 80 mL of MEK, heated to be completely dissolved, and then added to the SMA®1000 solution to react at 70° C. to 85° C. for 5 hours. 19.79 g of butanol serving as a capping agent was then added to the reaction to react at 70° C. to 85° C. for 5 hours to obtain polymer 8d. The graft ratio of the polycaprolactone was about 5%, and the acid value was about 40 mg KOH/g to 50 mg KOH/g. The reaction may refer to the reaction formulae in Example 1, in which x, y, z, and n correspond to the compositions and amounts of the reactants, such as x was about 10 to 12, y was about 8 to 10, z was about 0.3 to 0.5, and n was about 44 to 47. $R^7$ was H or butyl group, and H and butyl group have a ratio of about 20/80 (e.g. capping ratio is about 80%).

The polymer 8d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW79). In the white slurry, $TiO_2$ occupied 75 wt %, the polymer 8d occupied 1.69 wt %, and n-butyl acetate occupied the remaining part. The average diameter of the titanium dioxide in the dispersion was 372 nm, it means that the dispersing effect was fair (average diameter was 361 nm to 400 nm). Moreover, the titanium dioxide was easily agglomerated. The viscosity of the dispersion at 1000 rpm and 25° C. was 82 cps.

Example 10

60.00 g of SMA®1000 (commercially available from Cray Valley) was added to 120 mL of MEK under nitrogen, and heated and stirred to be completely dissolved. In addition, 426.00 g of the product in Synthesis Example 1-6 and 2.43 g of p-toluenesulfonic acid were added to 400 mL of MEK, heated to be completely dissolved, and then added to the SMA®1000 solution to react at 70° C. to 85° C. for 6 hours. 25 g of butanol serving as a capping agent was then added to the reaction to react at 70° C. to 85° C. for 3 hours to obtain polymer 9d. The graft ratio of the polycaprolactone was about 32%, and the acid value was about 10 mg KOH/g to 20 mg KOH/g. The chemical structure of the reaction product is

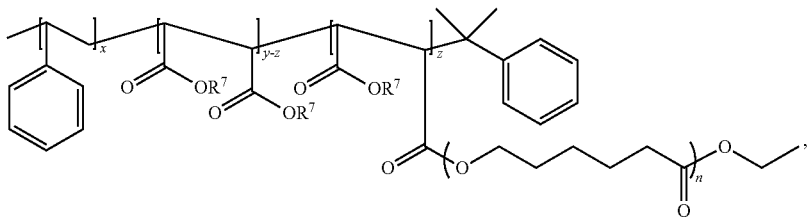

in which x, y, z, and n correspond to the compositions and amounts of the reactants, such as x was about 10 to 12, y was about 8 to 10, z was about 2 to 3, and n was about 44 to 47. $R^7$ was H or butyl group, and H and butyl group had a ratio of about 20/80 (e.g. capping ratio is about 80%).

The polymer 9d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 m to obtain white slurry (dispersion LW80). In the white slurry, $TiO_2$ occupied 75 wt %, the polymer 9d occupied 1.69 wt %, and n-butyl acetate occupied the remaining part. The average diameter of the titanium dioxide in the dispersion was 315 nm, it means that the dispersing effect was excellent (average diameter≤360 nm). The viscosity of the dispersion at 1000 rpm and 25° C. was 36 cps.

Example 11

40.00 g of SMA®1000 (commercially available from Cray Valley) was added to 80 mL of MEK under nitrogen, and heated and stirred to be completely dissolved. In addition, 291.70 g of the product in Synthesis Example 1-7 and 1.65 g of p-toluenesulfonic acid were added to 260 mL of MEK, heated to be completely dissolved, and then added to the SMA®1000 solution to react at 70° C. to 85° C. for 6 hours. 16.30 g of butanol serving as a capping agent was then added to the reaction to react at 70° C. to 85° C. for 4 hours to obtain polymer 10d. The graft ratio of the polycaprolactone was about 32%, and the acid value was about 7 mg KOH/g to 17 mg KOH/g. The chemical structure of the reaction product is

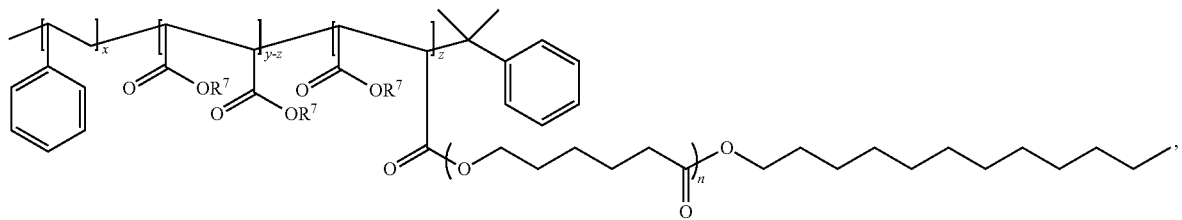

in which x, y, z, and n correspond to the compositions and amounts of the reactants, such as x was about 10 to 12, y was about 8 to 10, z was about 2 to 3, and n was about 44 to 47. $R^7$ was H or butyl group, and H and butyl group had a ratio of about 20/80 (e.g. capping ratio is about 80%).

The polymer 10d (serving as a dispersant), titanium dioxide powder (Kronos 2360), and n-butyl acetate (serving as a solvent) were stirred and pre-dispersed. Zirconia beads were added to the pre-dispersion, and the above mixture was put into an LAU miller to be dispersed by vibration at room temperature for 8 hours. After the vibration was completed, the vibrated result was filtered through a filtering cloth with pore size of 25 μm to obtain white slurry (dispersion LW81). In the white slurry, $TiO_2$ occupied 75 wt %, the polymer 10d occupied 1.69 wt %, and n-butyl acetate occupied the remaining part. The average diameter of the titanium dioxide in the dispersion was 325 nm, it means that the dispersing effect was excellent (average diameter≤360 nm). The viscosity of the dispersion at 1000 rpm and 25° C. was 36 cps.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A polymer, being formed by
capping a copolymer-graft-polylactone with an alcohol,
wherein the copolymer is copolymerized from an anhydride monomer with a double bond, a monomer with a double bond, and an initiator,
wherein the polymer has a chemical structure of

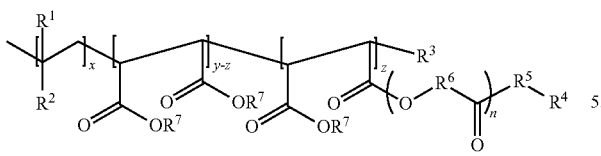

wherein $R^1$ is H or methyl group;
$R^2$ is H, $C_{6-12}$ aryl group, $C_{3-12}$ heteroaryl group, or $C_{1-10}$ alkyl group;
$R^3$ is H, methyl group, phenyl group, cumyl group, cumyl ester group, cumyl ether group, t-butyl ether group, benzoate group, cyanocyclohexane group, isobutyronitrile group, $C_{2-11}$ alkyl group, $C_{2-11}$ alkyl ester group, $C_{6-12}$ aryl group, $C_{3-12}$ heteroaryl group, or $C_{2-10}$ aliphatic group;

$R^4$ is $C_{1-12}$ alkyl group;
$R^5$ is O;
$R^6$ is $C_{4-12}$ alkylene group;
each of $R^7$ is H or $C_{1-12}$ alkyl group, and H and $C_{1-12}$ alkyl group have a ratio of 1:99 to 50:50;
x is 8 to 21;
y is 8 to 10;
z is 1 to 5; and
n is 15 to 90.

2. The polymer as claimed in claim 1, wherein the initiator comprises dibenzamidine peroxide, 2,2'-azobisisobutyronitrile, di(t-butyl) peroxide, t-butylhydroperoxide, 1,1'-azo (cyanocyclohexane), 2,5-dimethyl-2,5-bis(t-butyl peroxide) hexane, t-butyl peroyxbenzoate, cumene hydroperoxide, dicumyl peroxide, lauryl peroxide, or t-butyl peroxyacetate.

3. The polymer as claimed in claim 1, wherein 0.1≤z/y≤0.5.

4. The polymer as claimed in claim 1, having an acid value of 5 mg KOH/g to 50 mg KOH/g.

5. The polymer as claimed in claim 1, having a number average molecular weight of 3,000 g/mole to 20,000 g/mole.

6. A dispersion, comprising:
100 parts by weight of an organic solvent;
0.5 to 15 parts by weight of a polymer; and
10 to 82 parts by weight of a pigment powder,
wherein the polymer is formed by capping a copolymer-graft-polylactone with an alcohol,
wherein the copolymer is copolymerized from an anhydride monomer with a double bond, a monomer with a double bond, and an initiator,
wherein the polymer has a chemical structure of

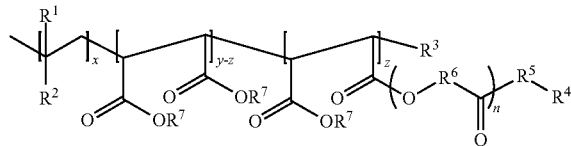

wherein $R^1$ is H or methyl group;
$R^2$ is H, $C_{6-12}$ aryl group, $C_{3-12}$ heteroaryl group, or $C_{1-10}$ alkyl group;
$R^3$ is H, methyl group, phenyl group, cumyl group, cumyl ester group, cumyl ether group, t-butyl ether group, benzoate group, cyanocyclohexane group, isobutyronitrile group, $C_{2-11}$ alkyl group, $C_{2-11}$ alkyl ester group, $C_{6-12}$ aryl group, $C_{3-12}$ heteroaryl group, or $C_{2-10}$ aliphatic group;

$R^4$ is $C_{1-12}$ alkyl group;

$R^5$ is O;

$R^6$ is $C_{4-12}$ alkylene group;

each of $R^7$ is H or $C_{1-12}$ alkyl group, and H and $C_{1-12}$ alkyl group have a ratio of 1:99 to 50:50;

x is 8 to 21;

y is 8 to 10;

z is 1 to 5; and n is 15 to 90.

7. The dispersion as claimed in claim 6, wherein the organic solvent comprises acetone, methyl ethyl ketone, ethyl acetate, n-butyl acetate, acrylate, or a combination thereof.

8. The dispersion as claimed in claim 6, wherein the pigment powder has an average diameter of 200 nm to 360 nm.

9. A paint, comprising:

100 parts by weight of an organic solvent;

0.1 to 10 parts by weight of a polymer;

10 to 60 parts by weight of a pigment powder; and 10 to 70 parts by weight of binder, wherein the polymer is formed by capping a copolymer-graft-polylactone with an alcohol, wherein the copolymer is copolymerized from an anhydride monomer with a double bond, a monomer with a double bond, and an initiator, wherein the polymer has a chemical structure of

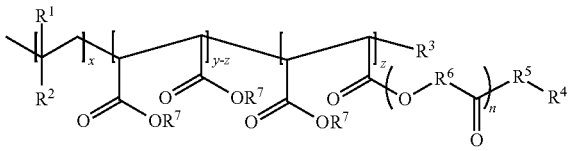

wherein $R^1$ is H or methyl group;

$R^2$ is H, $C_{6-12}$ aryl group, $C_{3-12}$ heteroaryl group, or $C_{1-10}$ alkyl group;

$R^3$ is H, methyl group, phenyl group, cumyl group, cumyl ester group, cumyl ether group, t-butyl ether group, benzoate group, cyanocyclohexane group, isobutyronitrile group, $C_{2-11}$ alkyl group, $C_{2-11}$ alkyl ester group, $C_{6-12}$ aryl group, $C_{3-12}$ heteroaryl group, or $C_{2-10}$ aliphatic group;

$R^4$ is $C_{1-12}$ alkyl group;

$R^5$ is O;

$R^6$ is $C_{4-12}$ alkylene group;

each of $R^7$ is H or $C_{1-12}$ alkyl group, and H and $C_{1-12}$ alkyl group have a ratio of 1:99 to 50:50;

x is 8 to 21;

y is 8 to 10;

z is 1 to 5; and n is 15 to 90.

10. The paint as claimed in claim 9, wherein the binder comprises polyester, polyacrylate polyol, polyurethane, polyacrylate, or a combination thereof.

11. The paint as claimed in claim 9, wherein the pigment powder has an average diameter of 200 nm to 420 nm.

* * * * *